(12) United States Patent
Ogawa et al.

(10) Patent No.: US 8,323,853 B2
(45) Date of Patent: Dec. 4, 2012

(54) FUEL CELL STACK

(75) Inventors: Tetsuya Ogawa, Wako (JP); Koji Dan, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 915 days.

(21) Appl. No.: 12/443,814

(22) PCT Filed: Oct. 4, 2007

(86) PCT No.: PCT/JP2007/069898
§ 371 (c)(1),
(2), (4) Date: Mar. 31, 2009

(87) PCT Pub. No.: WO2008/050616
PCT Pub. Date: May 2, 2008

(65) Prior Publication Data
US 2010/0092824 A1    Apr. 15, 2010

(30) Foreign Application Priority Data

Oct. 19, 2006   (JP) .................................. 2006-285211

(51) Int. Cl.
*H01M 8/04*    (2006.01)
*H01M 8/24*    (2006.01)

(52) U.S. Cl. ........ 429/514; 429/513; 429/512; 429/457; 429/456; 429/455

(58) Field of Classification Search ................... 429/514, 429/513, 512, 457, 456, 455
See application file for complete search history.

(56) References Cited

U.S. PATENT DOCUMENTS

| | | |
|---|---|---|
| 5,547,777 A | 8/1996 | Richards |
| 2004/0137307 A1 | 7/2004 | Okonogi et al. |
| 2005/0136319 A1 | 6/2005 | Tsunoda et al. |
| 2005/0142423 A1 | 6/2005 | Homma et al. |

FOREIGN PATENT DOCUMENTS

JP    2006-120589    5/2006

OTHER PUBLICATIONS

International Search Report for Application No. PCT/JP2007/069898, dated Mar. 10, 2008.

*Primary Examiner* — Helen O Conley
(74) *Attorney, Agent, or Firm* — Nelson Mullins Riley & Scarborough LLP; Anthony A. Laurentano

(57) ABSTRACT

A separator includes a first fuel gas supply unit, a second fuel gas supply unit, first sandwiching sections, second sandwiching sections, a first case unit and a second case unit. The first and second sandwiching sections are connected to the first fuel gas supply unit and the second fuel gas supply unit, respectively, through first bridges. The first case unit and the second case unit are connected to the first sandwiching sections and the second sandwiching sections through second bridges. A first surface pressure F1 generated near a fuel gas supply passage, a second surface pressure F2 generated near an oxygen-containing gas supply passage, and a third surface pressure F3 generated near electrolyte electrode assemblies have different values.

7 Claims, 13 Drawing Sheets

FUEL CELL STACK

RELATED APPLICATIONS

This application is a 35 U.S.C. 371 national stage filing of International Application No. PCT/JP2007/069898, filed on Oct. 4, 2007, which claims priority to Japanese Patent Application No. 2006-285211 filed on Oct. 19, 2006 in Japan. The contents of the aforementioned applications are hereby incorporated by reference.

TECHNICAL FIELD

The present invention relates to a fuel cell stack formed by stacking a plurality of fuel cells. Each of the fuel cells is formed by stacking electrolyte electrode assemblies and separators. Each of the electrolyte electrode assemblies includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, predetermined numbers of the electrolyte electrode assemblies and the separators are stacked together to form a fuel cell stack.

In the fuel cell, a fuel gas channel for supplying a fuel gas such as a hydrogen-gas to the anode and an oxygen-containing gas channel for supplying an oxygen-containing gas such as the air to the cathode are formed along surfaces of the separators.

For example, in a flat stack fuel cell disclosed in Japanese Laid-Open Patent Publication No. 2006-120589, as shown in FIG. 13, a separator 1 stacked on a power generation cell (not shown) is provided. The separator 1 is formed by connecting left and right manifold parts 2a and a part 2b at the center where the power generation cell is provided, by joint parts 2c. The joint parts 2c have elasticity.

The manifold parts 2a has gas holes 3, 4. One gas hole 3 is connected a fuel gas channel 3a, and the other gas hole 4 is connected to an oxygen-containing gas channel 4a. The fuel gas channel 3a and the oxygen-containing gas channel 4a extend in a spiral pattern into the part 2b, and are opened to a fuel electrode current collector and an air electrode current collector, respectively, at positions near the center of the part 2b.

In the above conventional technique, it is desired that the manifold parts 2a are sealed suitably, and the adjacent part 2b suitably contact the adjacent component. In particular, it is necessary to reliably prevent the leakage of the fuel gas or the oxygen-containing gas. In order to improve the sealing performance in the manifold parts 2a, normally, a large sealing load is applied to the manifold parts 2a.

However, since the joint parts 2c are formed around the part 2b where power generation is performed, when the large load is applied to the manifold parts 2a, the joint parts 2c likely to tightly contact each other. Thus, the exhaust gas is not smoothly discharged from the outer circumferential portion of the part 2b. Accordingly, temperature gradient is generated in the electrolyte electrode assemblies. As a result, the electrolyte electrode assemblies are damaged or degraded, and do not function properly. Therefore, power generation may not be performed efficiently and reliably.

DISCLOSURE OF INVENTION

The present invention solves the above problems, and an object of the present invention is to provide a fuel cell stack having simple structure in which leakage of reactant gases is prevented reliably, damage or degradation of electrolyte electrode assemblies is suitably prevented, the electrolyte electrode assemblies suitably contact separators, and power generation is performed efficiently and reliably.

The present invention relates to a fuel cell stack formed by stacking a plurality of fuel cells. Each of the fuel cells includes electrolyte electrode assemblies and separators. Each of the electrolyte electrode assemblies includes an anode, a cathode, an electrolyte interposed between the anode and the cathode.

Each of the separators includes sandwiching sections, first bridges, a first reactant gas supply unit, second bridges, a case unit, and second reactant gas supply unit. The sandwiching sections sandwich the electrolyte electrode assemblies. At least a fuel gas inlet for supplying a fuel gas along an electrode surface of the anode or an oxygen-containing gas inlet for supplying an oxygen-containing gas along an electrode surface of the cathode are formed in each of the sandwiching sections. The first bridges are connected to the sandwiching sections. Each of the first bridges has a first reactant gas supply channel for supplying the fuel gas to the fuel gas inlet or supplying the oxygen-containing gas to the oxygen-containing gas inlet. The first reactant gas supply unit is connected to the first bridges. A first reactant gas supply passage for supplying the fuel gas or the oxygen-containing gas to the first reactant gas supply channel extends through the reactant gas supply unit in a stacking direction. The second bridges are connected to the sandwiching sections. Each of the second bridges has a second reactant gas supply channel for supplying the fuel gas to the fuel gas inlet or supplying the oxygen-containing gas to the oxygen-containing gas inlet. The case unit is connected to the second bridges. The case unit contains the electrolyte electrode assemblies. The second reactant gas supply unit is provided in the case unit. Second reactant gas supply passage for supplying the oxygen-containing gas or the fuel gas to the second reactant gas supply channel extend through the second reactant gas supply unit in the stacking direction.

A first surface pressure (load per unit area) in the stacking direction is generated by applying a first load to the first reactant gas supply unit, a second surface pressure (load per unit area) in the stacking direction is generated by applying a second load to the second reactant gas supply units, and a third surface pressure (load per unit area) in the stacking direction is generated by a applying a third load to the sandwiching sections. The first surface pressure is larger than the second surface pressure, and the second surface pressure is larger than the third surface pressure.

Further, according to the present invention, the fuel cell stack further comprises a first load receiving member for receiving the first load in the stacking direction, a second load receiving member for receiving the second load in the stacking direction, and a third load receiving member for receiving the third load in the stacking direction. The first load receiving member has a first Young's modulus, the second load receiving member has a second Young's modulus, and the third load receiving member has a third Young's modulus. The first Young's modulus is larger than the second Young's modulus, and the second Young's modulus is larger than the third Young's modulus. The Young's modulus herein means an index indicating hardness, and is also referred to as the compressive elastic modulus or longitudinal elastic modulus.

In the present invention, different surface pressures (loads per unit area), i.e., the first surface pressure, the second surface pressure, and the third surface pressure applied in the stacking direction are generated for the first reactant gas supply unit, the second reactant gas supply unit, and the sandwiching sections. Thus, in the simple structure, suitable gas sealing for preventing leakage of the reactant gases is achieved, and the electrolyte electrode assemblies as power generating portions suitably contact the separators. The power generation is performed efficiently and reliably.

Further, in the presence of the first bridge and the second bridge, the load in the stacking direction is not transmitted between the first reactant gas supply unit, the second reactant gas supply unit, and the sandwiching sections. With the simple and compact structure, the surface pressure (load per unit area) applied to the area where good reactant gas sealing performance is required is large, and the surface pressure (load per unit area) applied to the electrolyte electrode assemblies is relatively small. Thus, the desired sealing performance is achieved in the first reactant gas supply unit and the second reactant gas supply unit, while preventing damage or degradation of the electrolyte electrode assemblies.

Further, in the present invention, the first Young's modulus of the first load receiving member for the first reactant gas supply unit is larger than the second Young's modulus of the second load receiving member for the second reactant gas supply unit, and the second Young's modulus is larger than the third Young's modulus of the third load receiving member for the sandwiching sections.

Thus, suitable gas sealing for preventing leakage of the reactant gases is achieved, and the electrolyte electrode assemblies suitably contact the adjacent separators. Leakage of the reactant gas is reliably prevented. The power generation is performed efficiently and reliably.

BEST MODE FOR CARRYING OUT THE INVENTION

Figure 1:
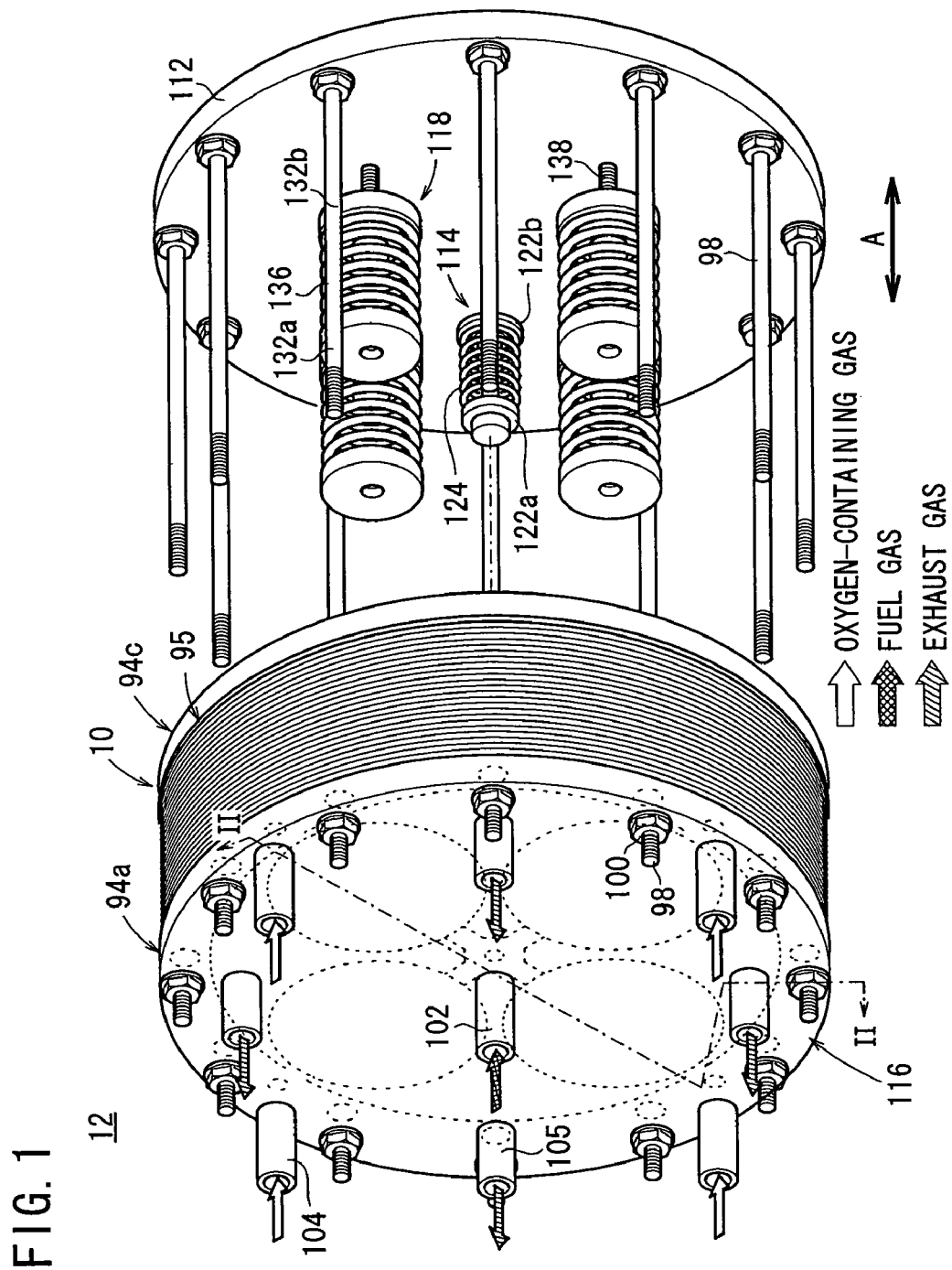
FIG. 1 is a perspective view schematically showing a fuel cell stack formed by stacking a plurality of fuel cells according to a first embodiment of the present invention.
Figure 2:
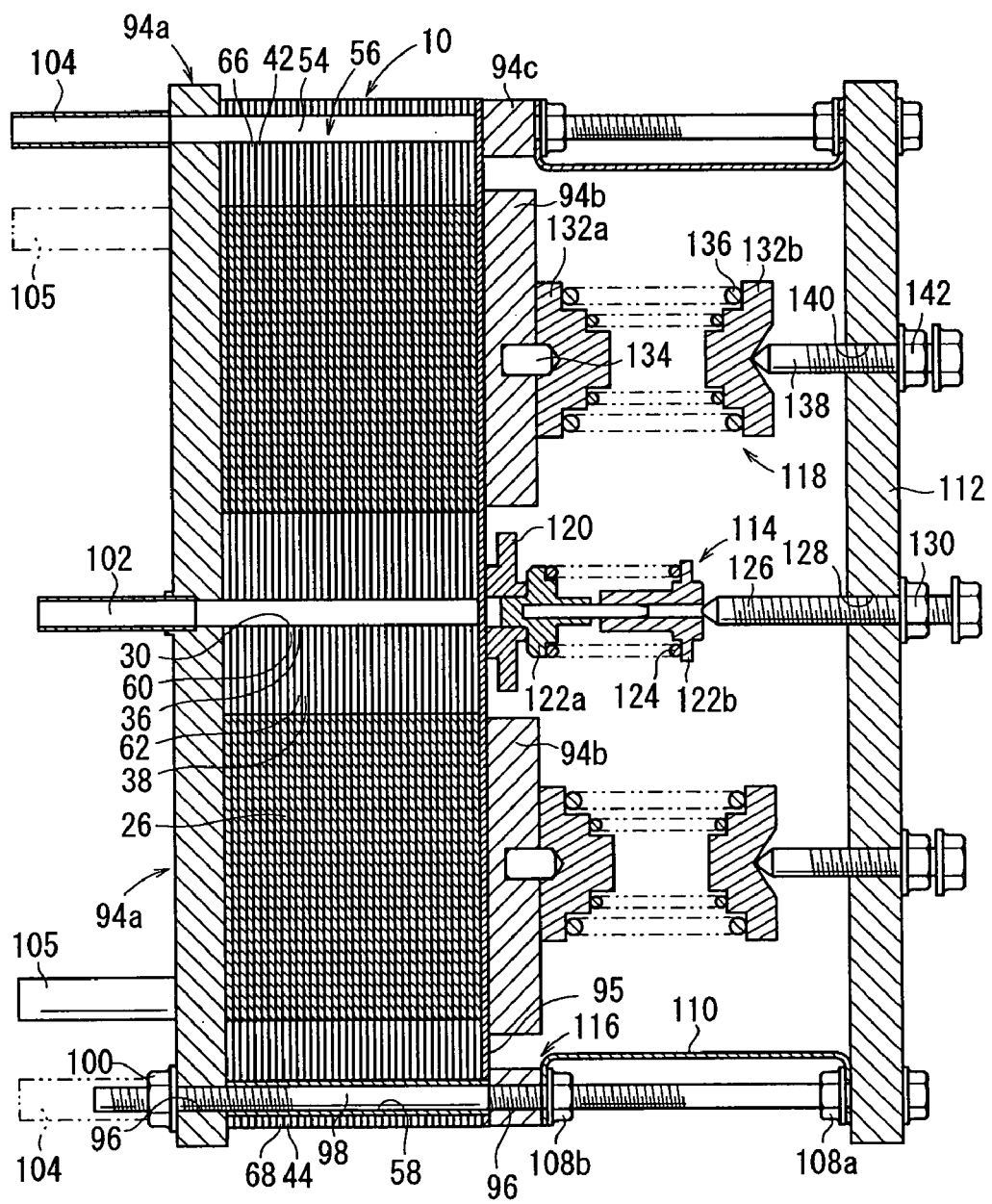
FIG. 2 is a cross sectional view showing the fuel cell stack taken along a line II-II in FIG. 1.

FIG. 1 is a perspective view schematically showing a fuel cell stack 12 formed by stacking fuel cells 10 according to a first embodiment of the present invention in a direction indicated by an arrow A. FIG. 2 is a cross sectional view showing the fuel cell stack 12 taken along a line II-II in FIG. 1.

Figure 3:
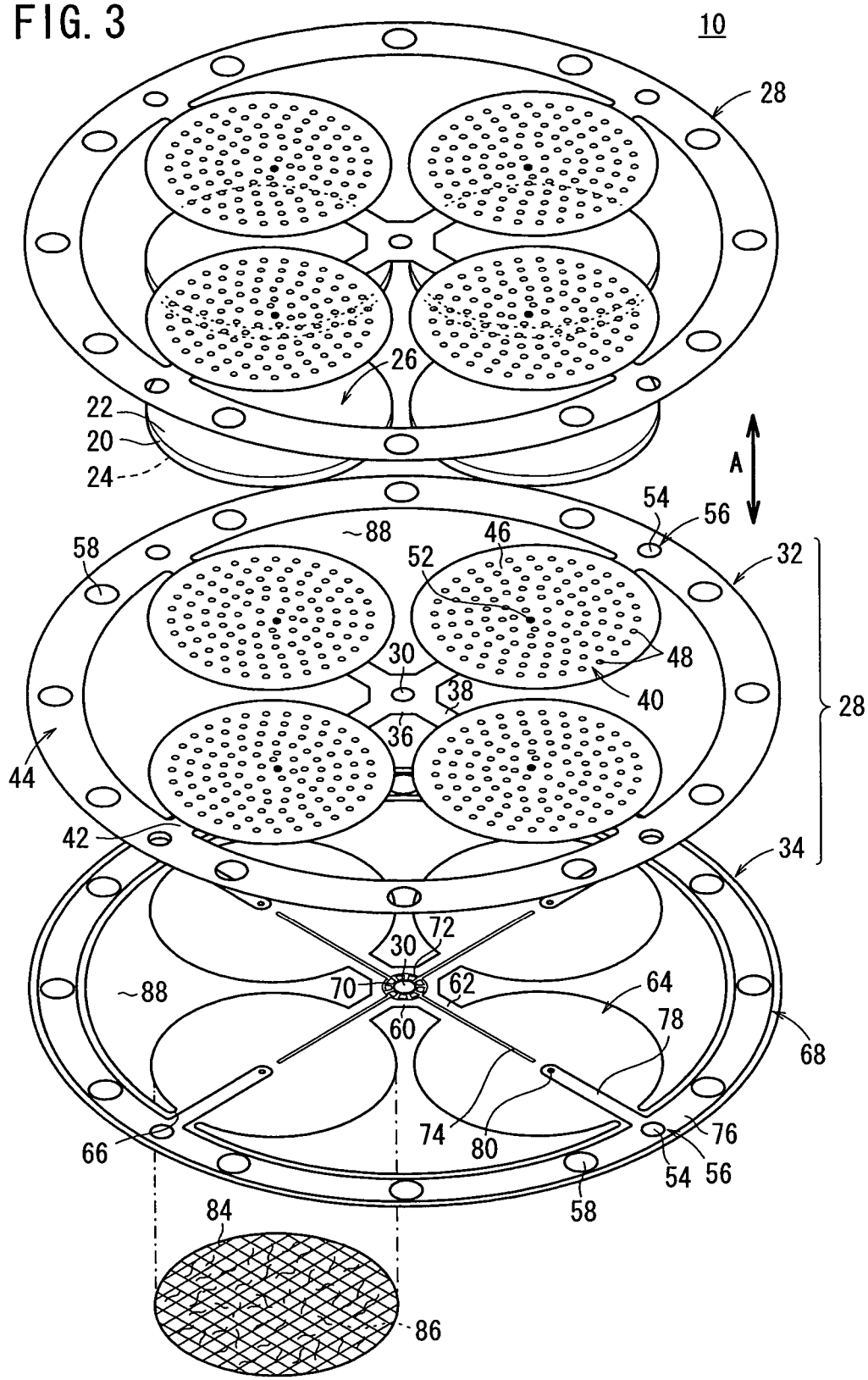
FIG. 3 is an exploded perspective view showing the fuel cell.
Figure 4:
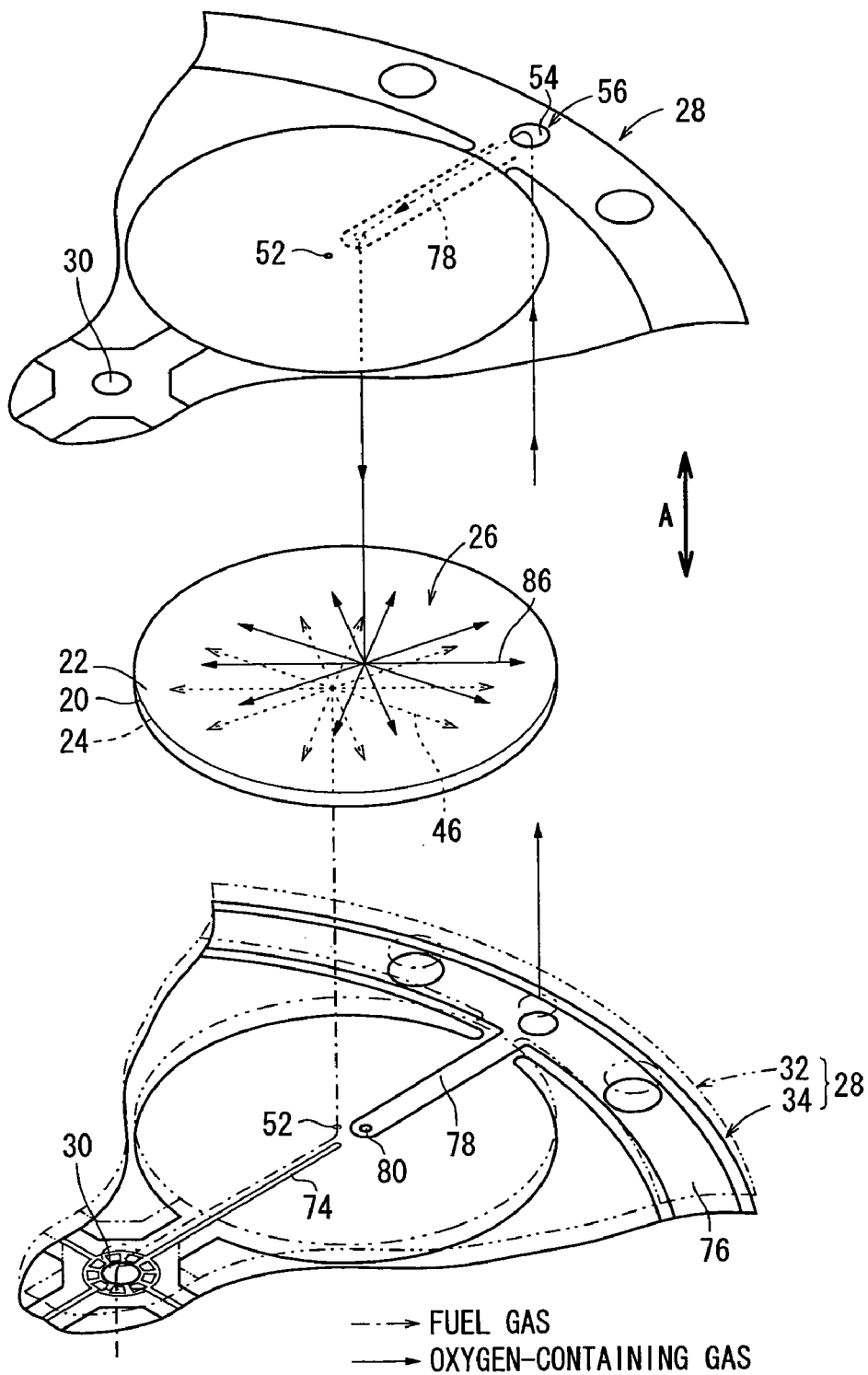
FIG. 4 is a partial exploded perspective view showing gas flows in the fuel cell.

The fuel cell 10 is used in various applications, including stationary and mobile applications. For example, the fuel cell 10 is mounted on a vehicle. The fuel cell 10 is a solid oxide fuel cell (SOFC). As shown in FIGS. 3 and 4, the fuel cell 10 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape.

As shown in FIG. 3, the fuel cell 10 is formed by sandwiching a plurality of, e.g., four electrolyte electrode assemblies 26 between a pair of separators 28. The four electrolyte electrode assemblies 26 are provided around a fuel gas supply passage 30 extending through the center of the separators 28, at predetermined intervals (angles) along a virtual circle concentrically with the fuel gas supply passage 30.

Each of the separators 28 includes first and second plates 32, 34. The first and second plates 32, 34 are metal plates of, e.g., stainless steel. For example, the first plate 32 and the second plate 34 are joined to each other by diffusion bonding, laser welding, or brazing. Instead of the metal plates, for example, carbon plates may be used as the first plate 32 and the second plate 34 (description regarding the method of joining the first carbon plate 32 and the second carbon plate 34 is omitted).

Figure 5:
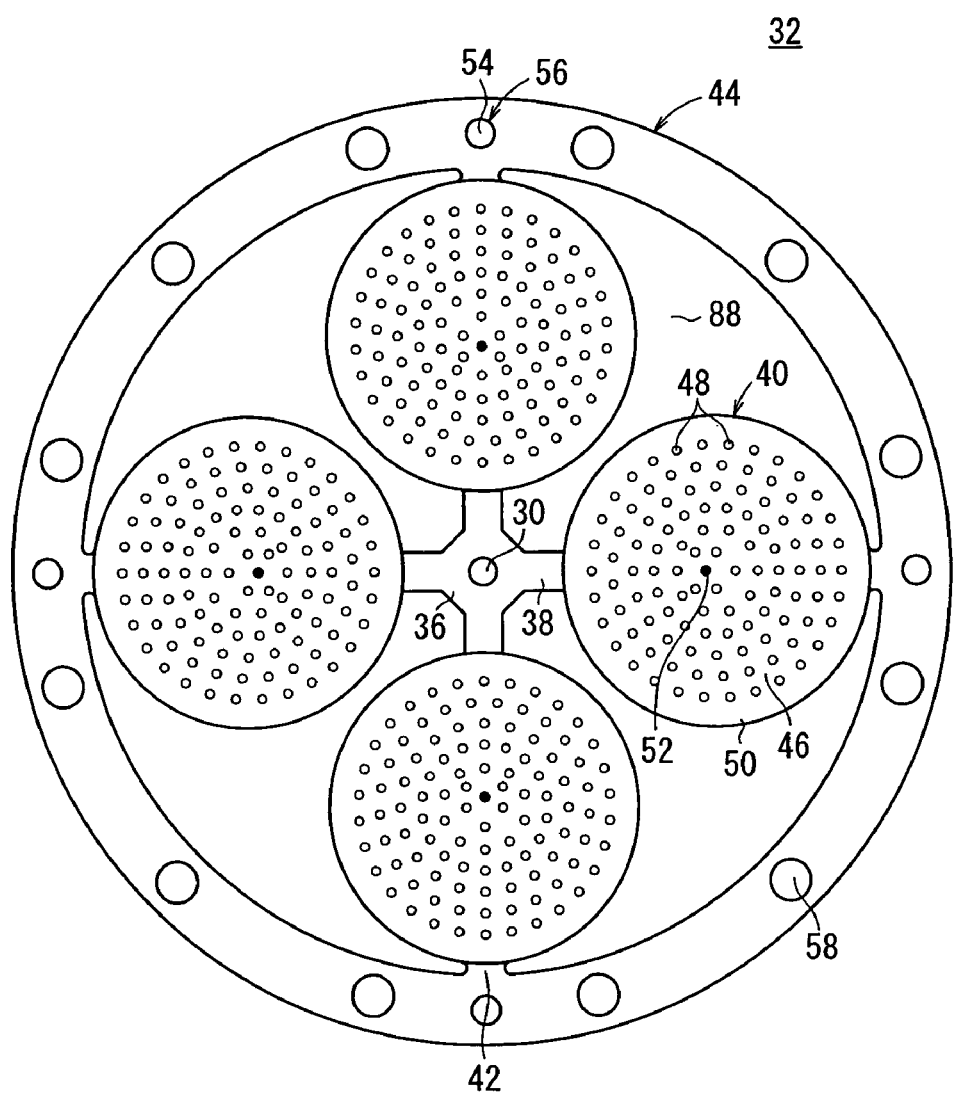
FIG. 5 is a view showing a first plate of the separator.

As shown in FIGS. 3 and 5, a first fuel gas supply unit (first reactant gas supply unit) 36 is formed in the first plate 32. The fuel gas supply passage (first reactant gas supply passage) 30 extends through the central portion of the fuel gas supply unit 36, for supplying a fuel gas in the stacking direction indicated by the arrow A. Four first bridges 38 extend radially outwardly from the first fuel gas supply unit 36 at equal intervals (angles). The first fuel gas supply unit 36 is integral with first sandwiching sections 40 each having a relatively large diameter. The first sandwiching section 40 and the electrolyte electrode assembly 26 have substantially the same size. The first sandwiching sections 40 are integral with an annular first case unit 44 through short second bridges 42.

Each of the first sandwiching sections 40 has a plurality of projections 48 on a surface which contacts the anode 24. The projections 48 form a fuel gas channel 46 for supplying a fuel gas along an electrode surface of the anode 24. The projections 48 function as a current collector. A fuel gas inlet 52 for supplying the fuel gas is formed at substantially the center of the first sandwiching section 40, at a position deviated toward the fuel gas supply passage 30 for supplying the fuel gas toward the substantially central region of the anode 24.

The first case unit 44 includes oxygen-containing gas supply units (second reactant gas supply units) 56. The oxygen-containing gas supply passages (second reactant gas supply passages) 54 extend through the oxygen-containing gas supply units 56 in the stacking direction, for supplying an oxygen-containing gas to oxygen-containing gas supply channels 78 as described later. A plurality of bolt insertion holes 58 are formed in the first case unit 44 at predetermined intervals (angles). The fuel gas supply passage 30, the first bridge 38, the first sandwiching section 40, the second bridge 42, and the oxygen-containing gas supply passage 54 are arranged in a straight line along the separator surface.

Figure 6:
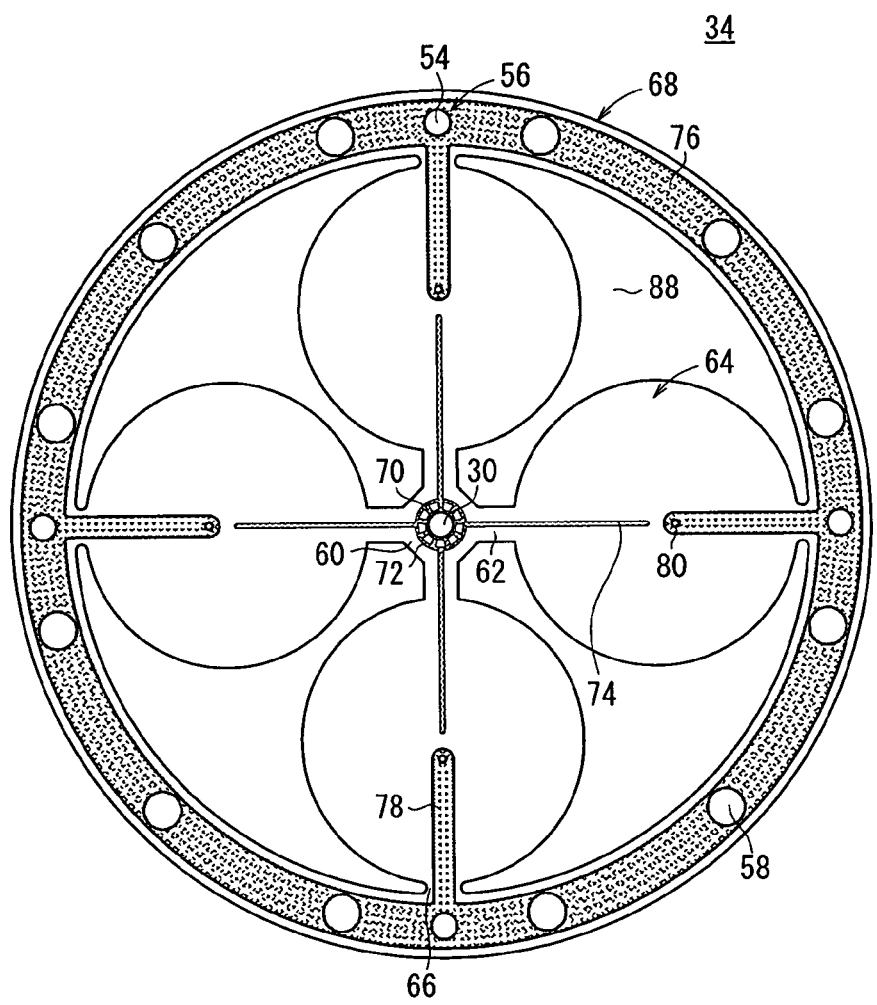
FIG. 6 is a view showing a second plate of the separator.

As shown in FIGS. 3 and 6, a second fuel gas supply unit (first reactant gas supply unit) 60 is formed in the second plate 34, and the fuel gas supply passage 30 extends through the center of the second fuel gas supply unit 60. Four first bridges 62 extend radially outwardly from the second fuel gas supply unit (first reactant gas supply unit) 60 at predetermined intervals (angles), and the second fuel gas supply unit 60 is integral with the second sandwiching sections 64 each having a relatively large diameter through the four first bridges 62. As in the case of the first sandwiching section 40, the second sandwiching section 64 and the electrolyte electrode assembly 26 have substantially the same size. Each of the second sandwiching sections 64 is integral with an annular second case unit 68 through short second bridges 66.

A plurality of grooves 70 connected to the fuel gas supply passage 30 are formed radially around the fuel gas supply passage 30, on a surface of the second fuel gas supply unit 60 which is joined to the first fuel gas supply unit 36. The grooves 70 are integrally connected to a circular groove 72, and the circular groove 72 is connected to four fuel gas supply channels (first reactant gas supply channels) 74. Each of the fuel gas supply channels 74 extends from the first bridge 62 to a position near substantially the center of the second sandwiching section 64, and terminates at the fuel gas inlet 52 of the first plate 32.

The second case unit 68 includes oxygen-containing gas supply units 56 and bolt insertion holes 58. The oxygen-containing gas supply passages 54 extend through the oxygen-containing gas supply units 56 in the stacking direction. The second case unit 68 has a filling chamber 76 on a surface joined to the first case unit 44, and the filling chamber 76 is filled with the oxygen-containing gas supplied from the oxygen-containing gas supply passages 54.

The filling chamber 76 is connected to the oxygen-containing gas supply channels (second reactant gas supply channels) 78. Each of the oxygen-containing gas supply channels 78 extends from the second bridge 66 to a position near substantially the center of the second sandwiching section 64, and the front end of the oxygen-containing gas supply channel 78 is connected to an oxygen-containing gas inlet 80 penetrating the second sandwiching section 64.

The first plate 32 has the projections 48 formed by, e.g., etching, and the second plate 34 has the grooves 70, the circular groove 72, the fuel gas supply channels 74, the filling chamber 76, and the oxygen-containing gas supply channels 78 formed by, e.g., etching.

As shown in FIG. 3, a deformable elastic channel unit (third load receiving member) such as an electrically conductive felt member (electrically conductive non-fabric such as metal felt) 84 is provided on a surface of the second plate 34 facing the cathode 22. The felt member 84 forms an oxygen-containing gas channel 86 between the second sandwiching section 64 and the cathode 22. Instead of the felt member 84, for example, a mesh member (electrically conductive fabric such as metal mesh), foamed metal, expanded metal, punching metal, or pressure embossed metal may be used. Exhaust gas channels 88 are provided around the electrolyte electrode assemblies 26 for discharging the fuel gas and the oxygen-containing gas after reaction as an exhaust gas.

Figure 7:
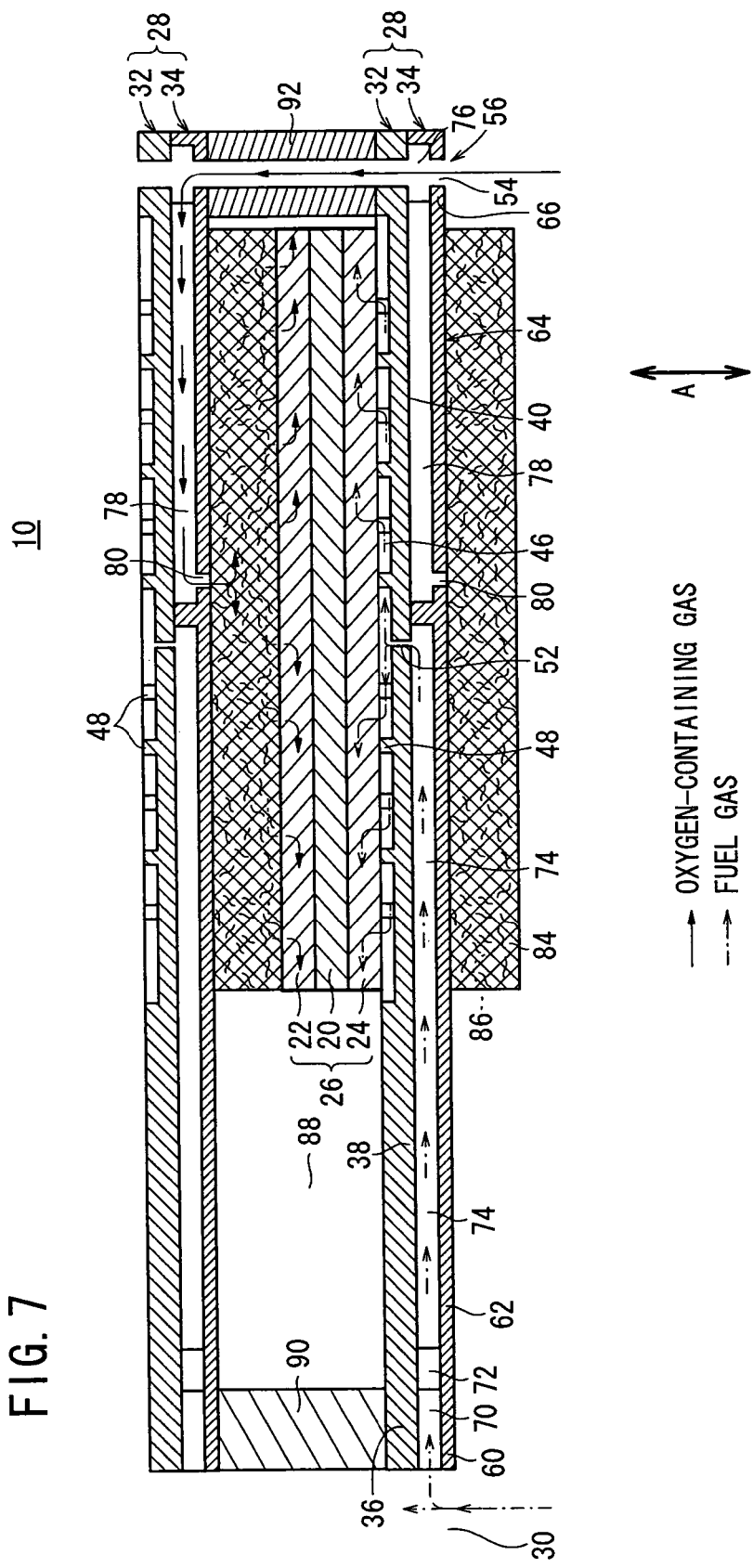
FIG. 7 is a cross sectional view schematically showing operation of the fuel cell.

As shown in FIG. 7, a first insulating seal (first load receiving member) 90 for sealing the fuel gas supply passage 30 and a second insulating seal (second load receiving member) 92 for sealing the oxygen-containing gas supply passages 54 are formed between the separators 28. The first insulating seal 90 and the second insulating seal 92 having good sealing performance are hard, and cannot be collapsed easily. For example, crustal component material, glass material, and composite material of clay and plastic may be used for the first insulating seal 90 and the second insulating seal 92. Further, preferably, the second insulating seal 92 is a heat insulating member for preventing diffusion of heat energy. The second insulating seal 92 has a ring shape corresponding to the first case unit 44 and the second case unit 68.

As shown in FIGS. 1 and 2, the fuel cell stack 12 is formed by providing a first end plate 94a having a substantially circular disk shape, at one end of the fuel cells 10 in the stacking direction, and a partition wall 95, a plurality of second end plates 94b each having a small diameter and a substantially circular disk shape, and a fixing ring 94c having a large diameter and a substantially ring shape, at the other end of the fuel cells 10 in the stacking direction. The partition wall 95 functions to prevent diffusion of the exhaust gas to the outside of the fuel cells 10. The end plates 94b are provided at four positions corresponding to positions where the electrolyte electrode assemblies 26 are stacked.

The first end plate 94a and the fixing ring 94c have a plurality of holes 96 connected to the bolt insertion holes 58 of the separators 28. By bolts 98 inserted through the holes 96 into the bolt insertion holes 58, and nuts 100 fitted to the bolts 98, the first case units 44 and the second case units 68 of the separators 28 are fixedly tightened to the first end plate 94a.

One fuel gas supply pipe 102 connected to the fuel gas supply passage 30, four oxygen-containing gas supply pipes 104 connected to the oxygen-containing supply gas passages 54, and four exhaust gas discharge pipes 105 connected to the exhaust gas channels 88 are provided at the first end plate 94a.

The first end plate 94a is fixed to a support plate 112 through bolts 98, nuts 108a, 108b, and plate collar members 110. A first load applying unit 114 for applying a first tightening load T1 to the first fuel gas supply unit 36 and the second fuel gas supply unit 60 (first reactant gas supply unit), second load applying units 116 for applying a second tightening load T2 to the oxygen-containing gas supply units 56 (second reactant gas supply units), and third load applying units 118 for applying a third tightening load T3 to the electrolyte electrode assemblies 26 through the first and second sandwiching sections 40, 64 are provided between the support plate 112 and the first end plate 94a.

In the first embodiment, by applying the first tightening load T1, a first surface pressure (load per unit area) F1 is generated in the first reactant gas supply unit, by applying the second tightening load T2, a second surface pressure (load per unit area) F2 is generated in the second reactant gas supply units, and by applying the third tightening load T3, a third surface pressure is generated in the sandwiching sections. The first surface pressure F1 is larger than the second surface pressure F2, and the second surface pressure F2 is larger than the third surface pressure F3 (F1>F2>F3). The first Young's modulus E1 of the first insulating seal 90 receiving the first tightening load T1 in the stacking direction is larger than second Young's modulus E2 of the second insulating seal 92 receiving the second tightening load T2 in the stacking direction, and the second Young's modulus E2 is larger than third Young's modulus E3 of the felt member 84 receiving the third tightening load T3 in the stacking direction (E1>E2>E3).

Specifically, the Young's modulus of the metal separator 28 made of stainless steel or the like is about 200 GPa. Preferably, the first Young's modulus E1 is about 1 GPa to about 20

GPa, the second Young's modulus E2 is about 100 MPa to about 1 GPa, and the third Young's modulus E3 is about 100 MP or less.

The first load applying unit 114 has a presser member 120 provided at the center of the fuel cells 10 (center of the first fuel gas supply unit 36 and the second fuel gas supply unit 60) for preventing leakage of the fuel gas from the fuel gas supply passage 30. The presser member 120 is provided near the center of the four arranged end plates 94b for pressing the fuel cells 10 through the partition wall 95. A first spring 124 is provided at the presser member 120 through a first receiver member 122a and a second receiver member 122b. The second receiver member 122b abuts against the tip end of the first presser bolt 126. The first presser bolt 126 is screwed into a first hole 128 formed in the support plate 112. The position of the first presser bolt 126 is adjustable through a first nut 130.

Each of the second load applying units 116 includes a bolt 98 inserted through the hole 96 into the bolt insertion hole 58, and the nut 100 fitted to the bolt 98. The second load applying unit 116 prevents leakage of the oxygen-containing gas from the oxygen-containing gas supply unit 56.

Each of the third load applying units 118 includes a third receiver member 132a at the second end plate 94b, corresponding to each of the electrolyte electrode assemblies 26. The third receiver member 132a is positioned on the second end plate 94b through the pin 134. One end of the second spring 136 contacts the third receiver member 132a and the other end of the second spring 136 contacts the fourth receiver member 132b. A tip end of the second presser bolt 138 contacts the fourth receiver member 132b. The second presser bolt 138 is screwed into the second screw hole 140 formed in the support plate 112. The position of the second presser bolt 138 is adjustable through the second unit 142.

Operation of the fuel cell stack 12 will be described below.

As shown in FIG. 1, the fuel gas is supplied through the fuel gas supply pipe 102 to the first end plate 94a. Then, the fuel gas flows into the fuel gas supply passage 30. The air as the oxygen-containing gas is supplied from the oxygen-containing gas supply pipes 104 to the first end plate 94a. Then, the oxygen-containing gas flows into the oxygen-containing gas supply units 56.

As shown in FIGS. 4 and 7, the fuel gas supplied to the fuel gas supply passage 30 flows in the stacking direction indicated by the arrow A, and the fuel gas is supplied from the grooves 70 to the circular groove 72 formed in the second plate 34 of the separator 28 of each fuel cell 10. After the fuel gas flows along each fuel gas supply channel 74, the fuel gas flows through the fuel gas inlet 52 formed in the first plate 32 to the fuel gas channel 46.

The fuel gas inlet 52 is provided at substantially the central position of the anode 24 of each electrolyte electrode assembly 26. Thus, the fuel gas is supplied from the fuel gas inlet 52 to the anode 24, and flows along the fuel gas channel 46 from the substantially central region to the outer circumferential region of the anode 24.

The air supplied to the oxygen-containing gas supply units 56 is temporarily filled into the filling chamber 76 provided between the first case unit 44 of the first plate 32 and the second case unit 68 of the second plate 34. The filling chamber 76 is connected to the oxygen-containing gas supply channel 78. The oxygen-containing gas moves toward the center of the first sandwiching section 40 and the second sandwiching section 64, along each oxygen-containing gas supply channel 78.

The oxygen-containing containing gas inlet 80 is opened to a position near the center of the second sandwiching section 64. The oxygen-containing gas inlet 80 is positioned at substantially the center of the cathode 22 of the electrolyte electrode assembly 26. Therefore, as shown in FIG. 7, the air is supplied from the oxygen-containing gas inlet 80 to the cathode 22. The oxygen-containing gas flows from the substantially central region to the outer circumferential region of the cathode 22 along the oxygen-containing gas channel 86 formed in the felt member 84.

Thus, in each of the electrolyte electrode assemblies 26, the fuel gas flows from substantially the central region to the outer circumferential region of the anode 24, and the air flows from the substantially central region to the outer circumferential region of the cathode 22 for generating electricity. The fuel gas and the air consumed in the power generation are discharged from the outer circumferential region of each of the electrolyte electrode assemblies 26, and flows through the exhaust gas channels 88.

In the first embodiment, in the presence of the first bridge 38, the load in the stacking direction is not transmitted between the first fuel gas supply unit 36 and the first sandwiching section 40, and in the presence of the first bridge 62, the load in the stacking direction is not transmitted between the second fuel gas supply unit 60 and the second sandwiching section 64. Likewise, in the presence of the second bridge 42, the load in the stacking direction is not transmitted between the first sandwiching section 40 and the first case unit 44, and in the presence of the second bridge 66, the load in the stacking direction is not transmitted between the second sandwiching section 64 and the second case unit 68.

Therefore, the first surface pressure F1 applied to the first fuel gas supply unit 36 and the second fuel gas supply unit 60 by the first load applying mechanism 114, the second surface pressure F2 applied to the oxygen-containing gas supply units 56 by the second load applying mechanism 116, and the third surface pressure F3 applied to the first sandwiching section 40 and the second sandwiching section 64 by the third load applying mechanism 118 are different from each other.

Specifically, the first surface pressure F1 is larger than the second surface pressure F2, and the second surface pressure F2 is larger than the third surface pressure F3 (F1>F2>F3). Thus, it is possible to easily and reliably ensure that the desired sealing performance is achieved in the fuel gas supply passage 30 and the oxygen-containing gas supply passage 54, and the electrolyte electrode assemblies 26 suitably contact the separators. Thus, it is possible to reliably prevent the leakage of the fuel gas and the oxygen-containing gas, and the power generation reaction is performed efficiently and reliably.

Further, the surface pressure F1 generated by the first load applying mechanism 114 in the first fuel gas supply unit 36 and the second fuel gas supply unit 60 where good fuel gas sealing performance is required is larger than the surface pressure F3 generated in the first sandwiching section 40 and the second sandwiching section 64, (F1>F3). Further, the surface pressure generated by the third load applying mechanism 118 in the electrolyte electrode assemblies 26 is relatively small. Thus, the desired fuel gas sealing performance is achieved in the fuel gas supply unit 36 and the second fuel gas supply unit 60, while preventing damage or degradation of the electrolyte electrode assemblies 26.

Likewise, the surface pressure F2 generated by the second load applying mechanism 116 to the oxygen-containing gas supply units 56 where good oxygen-containing gas sealing performance is required is larger than the surface pressure F3 applied to the first sandwiching sections 40 and the second sandwiching sections 64, (F2>F3). Thus, the desired oxygen-containing gas sealing performance is achieved in the oxygen-containing gas supply unit 56, while preventing damage or degradation of the electrolyte electrode assemblies 26.

Accordingly, in each of the fuel cells 10, with the simple and compact structure, power generation is performed efficiently. In particular, by maximizing the first surface pressure F1, it is possible to prevent the leakage of the fuel gas as much as possible, and improve fuel economy, and reliably perform thermally self-sustained operation.

The electrolyte electrode assemblies 26 suitably contact the adjacent components, and it is possible to prevent the damage of the electrolyte electrode assemblies 26 due to generation of an excessively large surface pressure. Thus, the electrolyte electrode assemblies 26 can be used suitably for reliable and sufficient power generation over a long period of time. Improvement in the durability of the electrolyte electrode assemblies 26 is achieved easily. The desired sealing performance for preventing the leakage of the fuel gas and the oxygen-containing gas is achieved, and the electrolyte electrode assemblies 26 suitably contact the separators.

Further, in the first embodiment, the first Young's modulus E1 of the first insulating seal 90 receiving the first tightening load T1 in the stacking direction is larger than the second Young's modulus E2 of the second insulating seal 92 receiving the second tightening load T2 in the stacking direction, and the second Young's modulus E2 is larger than third Young's modulus E3 of the felt member 84 receiving the third tightening load T3 in the stacking direction (E1>E2>E3).

Thus, when the largest first tightening load T1 is applied to the first insulating seal 90, the first insulating seal 90 reliably absorbs the first tightening load T1 to prevent the leakage of the fuel gas. Further, the second insulating seal 92 having the second Young's modulus E2 prevents the leakage of the oxygen-containing gas, and has the following capability in the stacking direction to apply the desired load to the oxygen-containing gas supply units 56.

Further, the felt members 84 have the third Young's modulus E3 with the height following capability, while contacting the electrolyte electrode assemblies 26 suitably. Thus, the electrolyte electrode assemblies 26 are not damaged, and reliably and suitably contact the separators.

Figure 8:
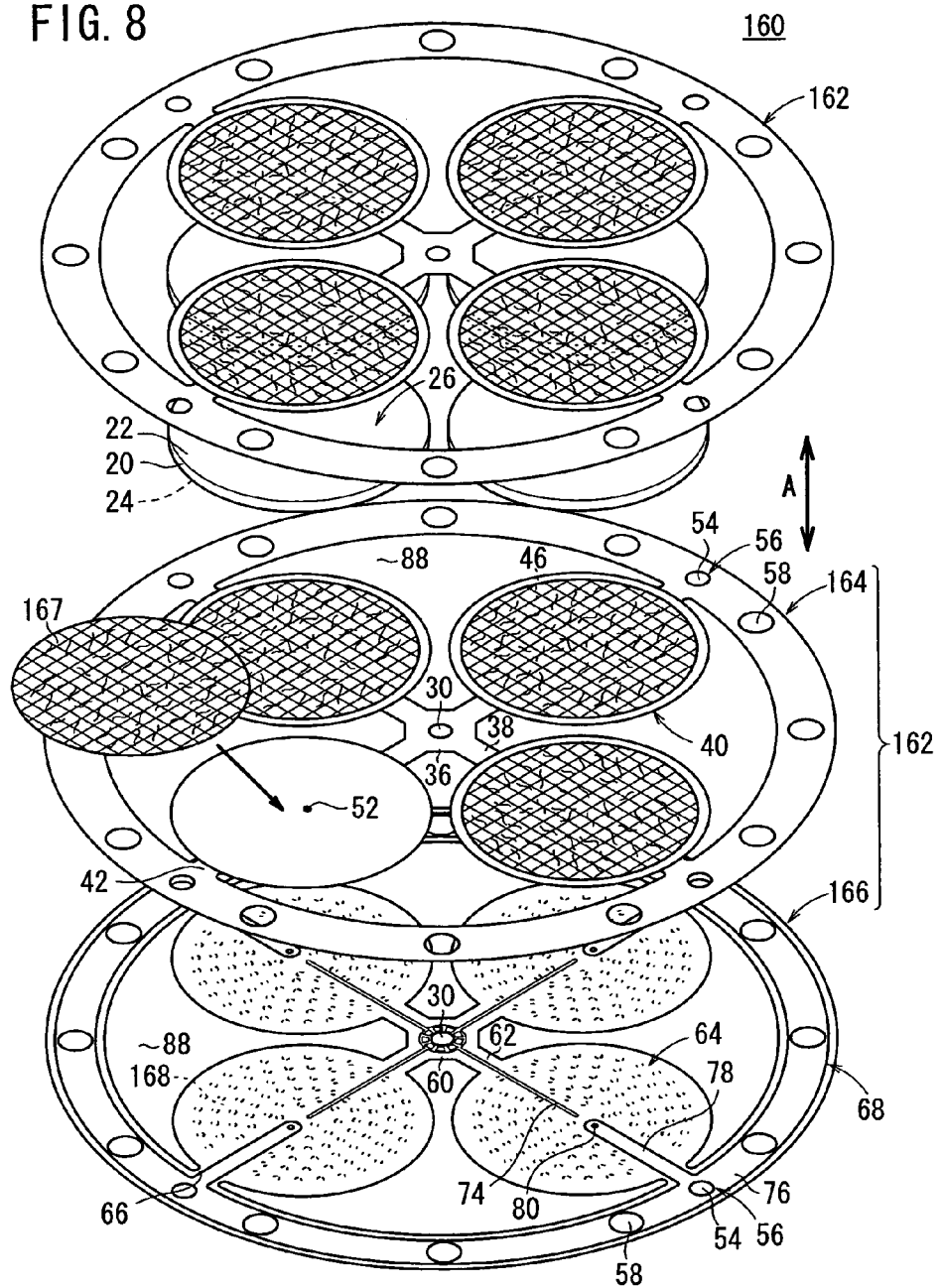
FIG. 8 is an exploded perspective view showing a fuel cell of a fuel cell stack according to a second embodiment of the present invention.
Figure 9:
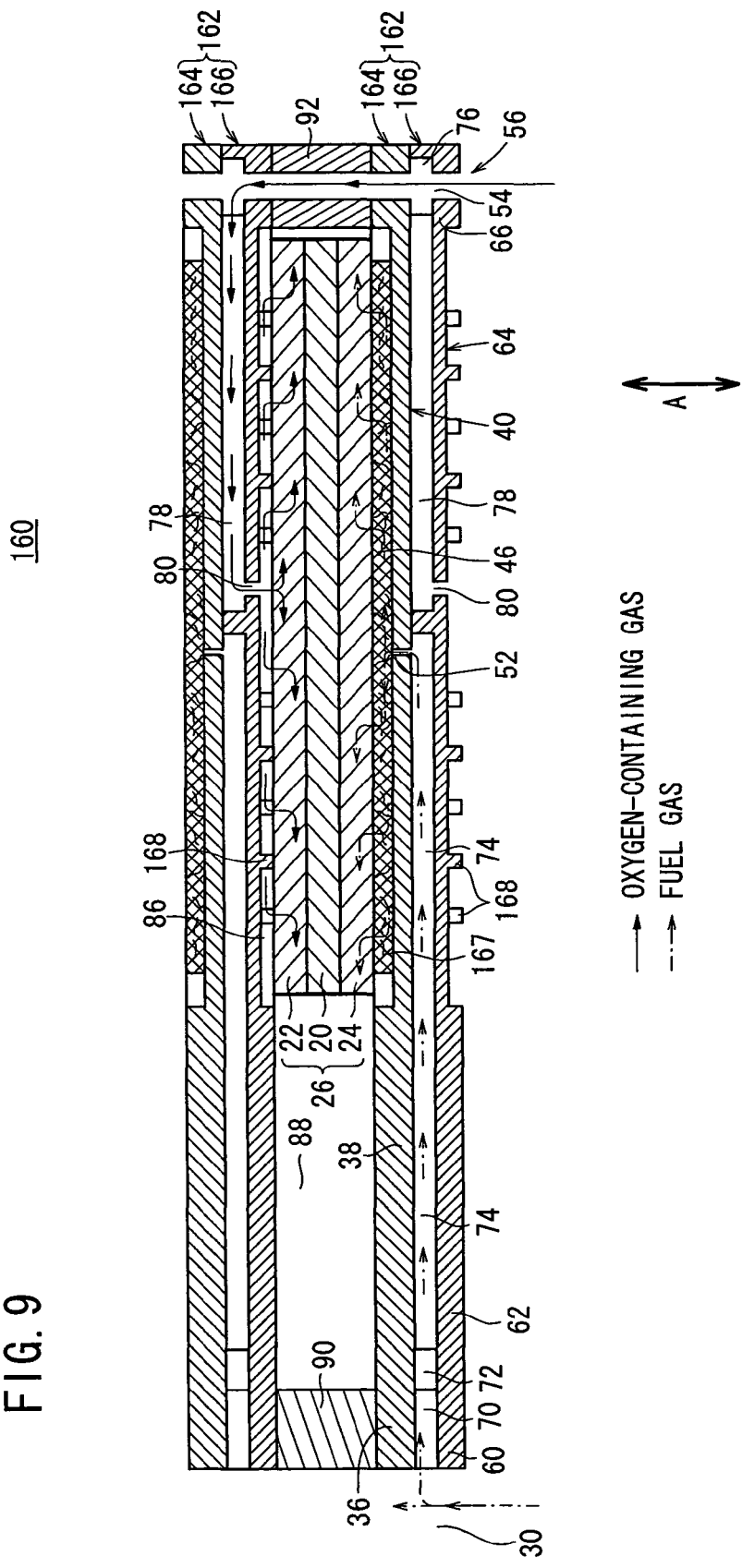
FIG. 9 is a cross sectional view schematically showing operation of the fuel cell.

FIG. 8 is an exploded perspective view showing a fuel cell 160 according to a second embodiment of the present invention. FIG. 9 is a cross sectional view showing operation of the fuel cell 160. The constituent elements that are identical to those of the fuel cell 10 according to the first embodiment are labeled with the same reference numeral, and description thereof will be omitted. Further, in third to fifth embodiments as described later, the constituent elements that are identical to those of the fuel cell 10 according to the first embodiment are labeled with the same reference numeral, and description thereof will be omitted.

The fuel cell 160 has a separator 162 including a first plate 164 and a second plate 166. Each of the first sandwiching sections 40 of the first plate 164 has a planar surface which contacts the electrolyte electrode assemblies 26, an electrically conductive felt member (electrical conductive non-fabric such as metal felt) 167 is provided on the planar surface. The felt member 167 forms a fuel gas channel 46 for supplying the fuel gas along the electrode surface of the anode 24, and tightly contacts the anode 24 (see FIGS. 8 and 9). Instead of the electrically conductive felt member 167, for example, a mesh member (electrically conductive fabric such as metal mesh), foamed metal, expanded metal, punching metal, pressure embossed metal may be used.

The second plate 166 includes second sandwiching sections 64, and each of the second sandwiching sections 64 includes a plurality of projections 168 on a surface which contacts the cathode 22. The projections 168 form an oxygen-containing gas channel 86. The projections 168 are formed by, e.g., etching.

In the second embodiment, the first surface pressure F1 generated in the first fuel gas supply unit 36 and the second fuel gas supply unit 60 in the stacking direction is larger than the second surface pressure F2 generated in the oxygen-containing gas supply units 56 in the stacking direction, and the second surface pressure F2 is larger than the third surface pressure F3 generated in the electrolyte electrode assemblies 26 through the first sandwiching section 40 and the second sandwiching section 64 in the stacking direction (F1>F2>F3).

Further, the first Young's modulus E1 of the first insulating seal 90 receiving the first tightening load T1 in the stacking direction is larger than the second Young's modulus E2 of the second insulating seal 92 receiving the second tightening load T2 in the stacking direction, and the second Young's modulus E2 is larger than third Young's modulus E3 of the felt member 167 receiving the third tightening load T3 in the stacking direction (E1>E2>E3).

Thus, in the second embodiment, the same advantages as in the case of the first embodiment can be obtained. For example, it is possible to prevent the leakage of the fuel gas and the oxygen-containing gas as much as possible, the electrolyte electrode assemblies 26 suitably contact the separators, and it is possible to prevent the damage of the electrolyte electrode assemblies 26.

Figure 10:
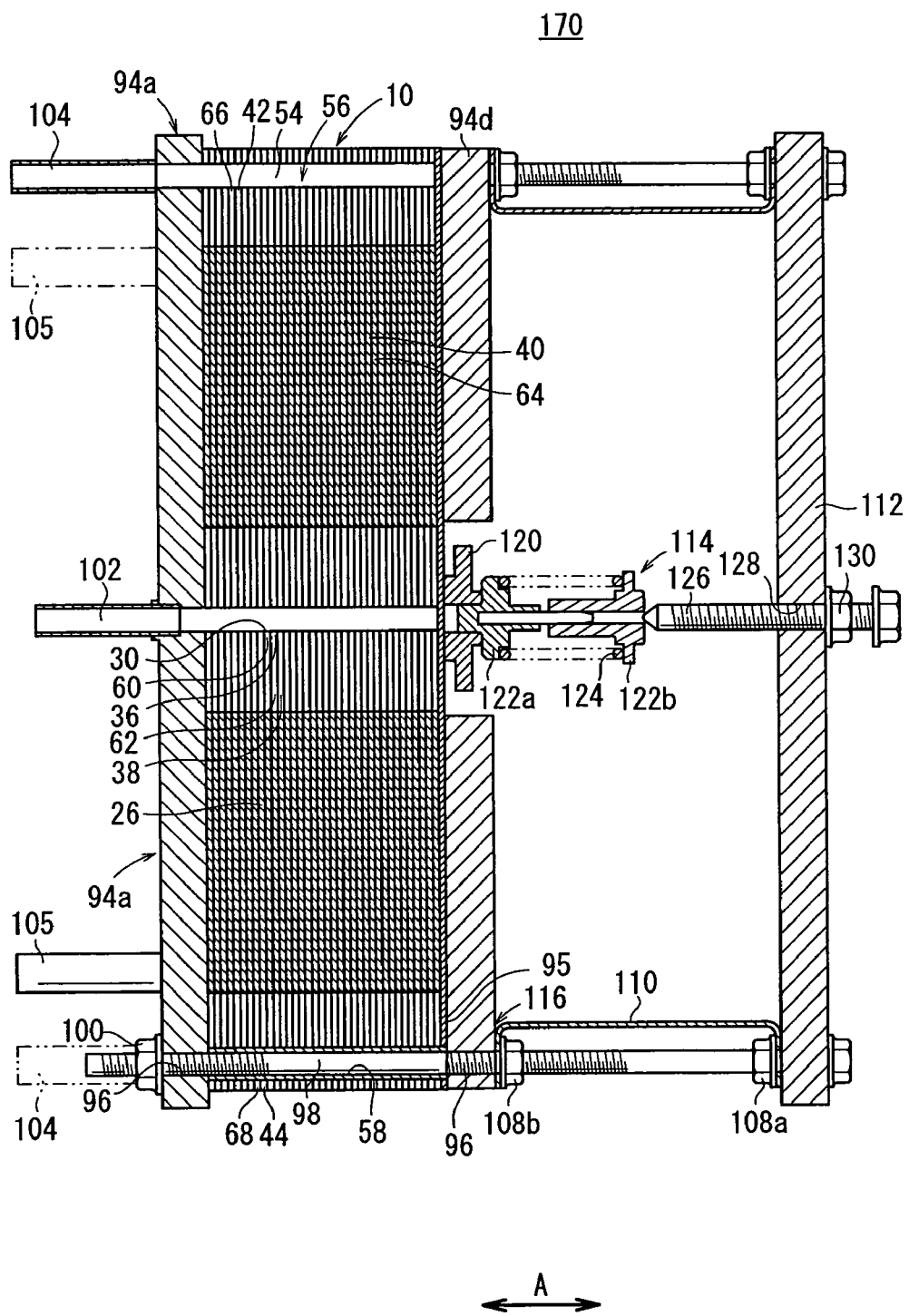
FIG. 10 is a side view showing a fuel cell stack according to a third embodiment of the present invention.

FIG. 10 is a side view showing a fuel cell stack 170 according to a third embodiment of the present invention.

The fuel cell stack 170 is formed by sandwiching a plurality of fuel cells 10 between a first end plate 94a and a second end plate 94d. The second end plate 94d has a substantially donut shape. In effect, the second end plate 94d has structure combining the second end plates 94b and the fixing ring 94c in the first embodiment integrally.

On the second end plate 94d side, a first load applying mechanism 114 and a second load applying mechanism 116 are provided. The second load applying mechanism 116 tightens components between the first end plate 94a and the second end plate 94d by bolts 98 to generate a second surface pressure F2 applied to the oxygen-containing gas supply units 56 in the stacking direction, and a third surface pressure F3 applied to the electrolyte electrode assemblies 26 in the stacking direction.

Thus, in the third embodiment, the same advantages as in the cases of the first and second embodiments can be obtained. Further, in the third embodiment, no third load applying mechanism 118 is required, and the overall structure of the fuel cell stack 170 is further simplified advantageously.

Figure 11:
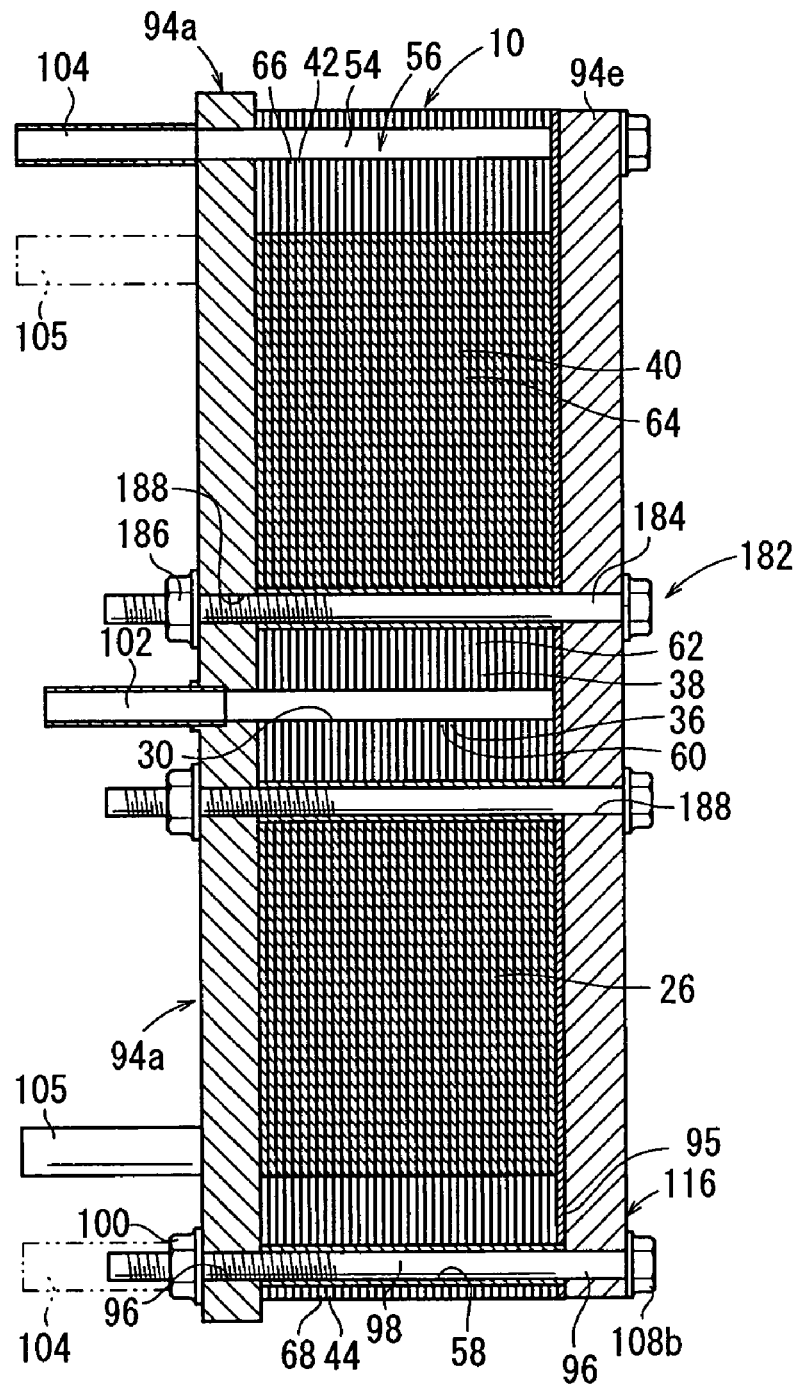
FIG. 11 is a side view showing a fuel cell stack according to a fourth embodiment of the present invention.

FIG. 11 is a side view showing a fuel cell stack 180 according to a fourth embodiment of the present invention.

The fuel cell stack 180 is formed by sandwiching a plurality of fuel cells 10 between a first end plate 94a and a second end plate 94e. A first load applying mechanism 182 and a second load applying mechanism 116 are provided between the first end plate 94a and the second end plate 94e.

The first load applying mechanism 182 is provided adjacent to the first fuel gas supply unit 36 and the second fuel gas supply unit 60, and includes a plurality of bolts 184 and nuts 186. The first end plate 94a and the second end plate 94e have holes 188 that surround the fuel gas supply passage 30, for inserting bolts 184 between the first and second bridges 38, 62.

In the fourth embodiment, the first load tightening mechanism 182 applies a tightening load to areas near the fuel gas supply passage 30 and the second load tightening mechanism 116 applies a tightening load to an area near the oxygen-containing gas supply passages 54.

In the structure, in each of the fuel cells 10, a first surface pressure F1 is generated in the first fuel gas supply unit 36 and the second fuel gas supply unit 60, and a second surface pressure F2 is generated in the oxygen-containing gas supply units 56. Further, a third surface pressure F3 is generated in each of the electrolyte electrode assemblies 26. Thus, in the fuel cell stack 180, the same advantages as in the cases of the first to third embodiments can be obtained. The structure is simplified significantly, and size reduction is achieved advantageously.

Figure 12:
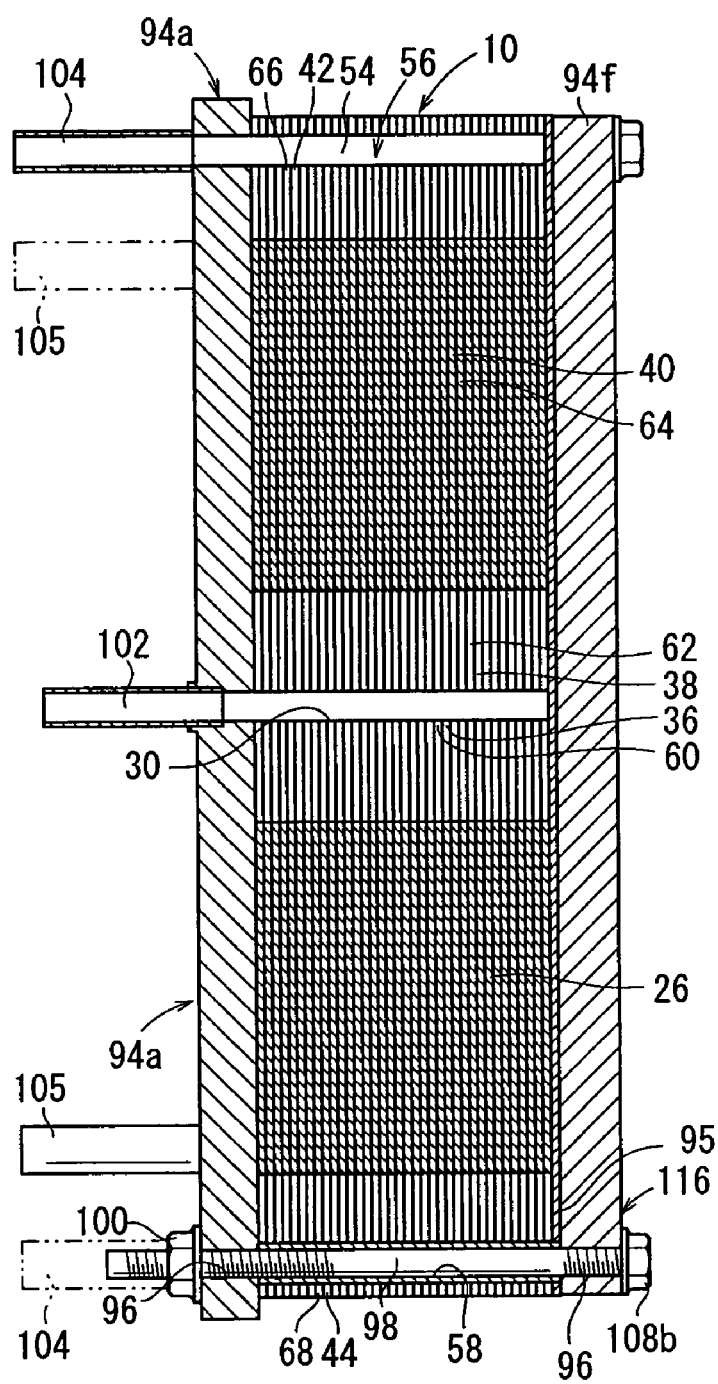
FIG. 12 is a side view showing a fuel cell stack according to a fifth embodiment of the present invention.
Figure 13:
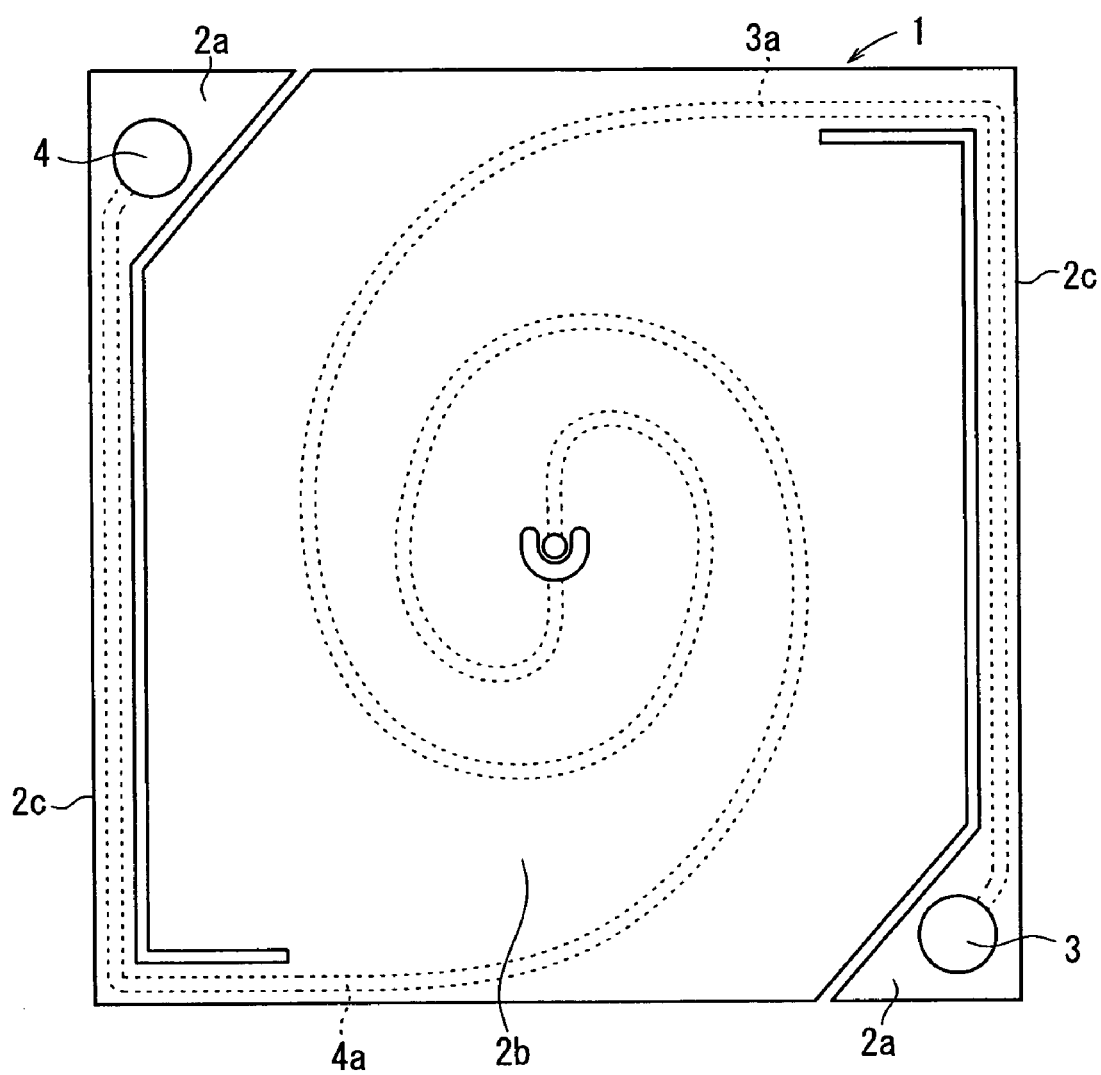
FIG. 13 is a view showing a conventional flat stack fuel cell.

FIG. 12 is a side view showing a fuel cell stack according 190 to the fifth embodiment of the present invention.

The fuel cell stack 190 is formed by sandwiching a plurality of fuel cells 10 between a first end plate 94a and a second end plate 94f. Only a second load applying mechanism 116 is provided between the first end plate 94a and the second end plate 94f.

In the fuel cell stack 190, the second load applying mechanism 116 applies a tightening load to components between the first end plate 94a and the second end plate 94f. Thus, a first surface pressure F1 generated in the first fuel gas supply unit 36 and the second fuel gas supply unit 60, and a second surface pressure F2 is generated in the oxygen-containing gas supply units 56. Further, a third surface pressure F3 is generated in the electrolyte electrode assemblies 26.

Thus, in the fifth embodiment, the same advantages as in the cases of the first to fourth embodiments can be obtained. Further, the structure is further simplified advantageously.

The invention claimed is:

1. A fuel cell stack formed by stacking a plurality of fuel cells formed by stacking electrolyte electrode assemblies and separators, said electrolyte electrode assemblies each including an anode, a cathode, and an electrolyte interposed between said anode and said cathode, said separators each comprising:

sandwiching sections for sandwiching said electrolyte electrode assemblies, at least a fuel gas inlet for supplying a fuel gas along an electrode surface of said anode or an oxygen-containing gas inlet for supplying an oxygen-containing gas along an electrode surface of said cathode being formed in each of said sandwiching sections;

first bridges connected to said sandwiching sections, and each having a first reactant gas supply channel for supplying the fuel gas to said fuel gas inlet or supplying the oxygen-containing gas to said oxygen-containing gas inlet;

a first reactant gas supply unit connected to said first bridges, a first reactant gas supply passage extending through said first reactant gas supply unit in a stacking direction for supplying the fuel gas or the oxygen-containing gas to said first reactant gas supply channel;

second bridges connected to said sandwiching sections, and each having a second reactant gas supply channel for supplying the fuel gas to said fuel gas inlet or supplying the oxygen-containing gas to said oxygen-containing gas inlet;

a case unit connected to said second bridges, said case unit containing said electrolyte electrode assemblies;

a second reactant gas supply unit provided in said case unit, a second reactant gas supply passage extending through said second reactant gas supply unit in the stacking direction for supplying the oxygen-containing gas or the fuel gas to said second reactant gas supply channel;

a first load applying mechanism provided at said first reactant gas supply unit;

a second load applying mechanism provided at said second reactant gas supply unit; and a third load applying mechanism provided at said sandwiching sections, wherein a first surface pressure in the stacking direction is generated by applying a first load to said first reactant gas supply unit, a second surface pressure in the stacking direction is generated by applying a second load to said second reactant gas supply unit, and a third surface pressure in the stacking direction is generated by applying a third load to said sandwiching sections, the first surface pressure being larger than the second surface pressure, and the second surface pressure being larger than the third surface pressure.

2. A fuel cell stack according to claim 1, further comprising a first load receiving member for receiving the first load in the stacking direction, a second load receiving member for receiving the second load in the stacking direction, and a third load receiving member for receiving the third load in the stacking direction, wherein said first load receiving member has a first Young's modulus, said second load receiving member has a second Young's modulus, and said third load receiving member has a third Young's modulus; and the first Young's modulus is larger than the second Young's modulus, and the second Young's modulus is larger than the third Young's modulus.

3. A fuel cell stack formed by stacking a plurality of fuel cells formed by stacking electrolyte electrode assemblies and separators, said electrolyte electrode assemblies each including an anode, a cathode, and an electrolyte interposed between said anode and said cathode, said separators each comprising:

sandwiching sections for sandwiching said electrolyte electrode assemblies, at least a fuel gas inlet for supplying a fuel gas along an electrode surface of said anode or an oxygen-containing gas inlet for supplying an oxygen-containing gas along an electrode surface of said cathode being formed in each of said sandwiching sections;

first bridges connected to said sandwiching sections, and each having a first reactant gas supply channel for supplying the fuel gas to said fuel gas inlet or supplying the oxygen-containing gas to said oxygen-containing gas inlet;

a first reactant gas supply unit connected to said first bridges, a first reactant gas supply passage extending through said reactant gas supply unit in a stacking direction for supplying the fuel gas or the oxygen-containing gas to said first reactant gas supply channel;

second bridges connected to said sandwiching sections, and each having a second reactant gas supply channel for supplying the fuel gas to said fuel gas inlet or supplying the oxygen-containing gas to said oxygen-containing gas inlet;

a case unit connected to said second bridges, said case unit containing said electrolyte electrode assemblies; and a second reactant gas supply unit provided in said case unit, a second reactant gas supply passage extending through said second reactant gas supply unit in the stacking direction for supplying the oxygen-containing gas or the fuel gas to said second reactant gas supply channel;

a first load receiving member for receiving a first load applied to said first reactant gas supply unit in the stacking direction;

a second load receiving member for receiving a second load applied to said second reactant gas supply unit in the stacking direction; and a third load receiving member for receiving a third load applied to said sandwiching sections in the stacking direction, wherein said first load receiving member has a first Young's modulus, said second load receiving member has a second Young's modulus, and said third load receiving member has a third Young's modulus; and the first Young's modulus is larger than the second Young's modulus, and the second Young's modulus is larger than the third Young's modulus.

4. A fuel cell stack according to claim 3, wherein a first surface pressure is generated on said first load receiving member receiving said first load, a second surface pressure is generated on said second load receiving member receiving said second load, and a third surface pressure is generated on said third load receiving member receiving said third load; and the first surface pressure is larger than the second surface pressure, and the second surface pressure is larger than the third surface pressure.

5. A fuel cell stack according to claim 3, further comprising a load applying mechanism provided at said second reactant gas supply unit, for applying the first load, the second load, and the third load.

6. A fuel cell stack according to claim 3, further comprising a first load applying mechanism provided at said first reactant gas supply unit, and a second load applying mechanism provided at said second reactant gas supply unit, wherein the first load, the second load, and the third load are applied by said first load applying mechanism and said second load applying mechanism.

7. A fuel cell stack according to claim 3, further comprising a first load applying mechanism provided at said first reactant gas supply unit, a second load applying mechanism provided at said second reactant gas supply unit, and a third load applying mechanism provided at said sandwiching sections.

\* \* \* \* \*